US012775647B2

(12) United States Patent
Gong et al.

(10) Patent No.: US 12,775,647 B2
(45) Date of Patent: Oct. 27, 2026

(54) QUERY RESPONSE GENERATION USING A LARGE LANGUAGE MODEL BASED ON STRUCTURED DATA AND UNSTRUCTURED DATA

(71) Applicant: Dell Products L.P., Round Rock, TX (US)

(72) Inventors: Min Gong, Shanghai (CN); Qicheng Qiu, Shanghai (CN); Sanjay Mandadi, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 188 days.

(21) Appl. No.: 18/912,951

(22) Filed: Oct. 11, 2024

(65) Prior Publication Data

US 2026/0105081 A1 Apr. 16, 2026

(51) Int. Cl.

| | |
|---|---|
| ***G06F 16/334*** | (2025.01) |
| ***G06F 16/25*** | (2019.01) |
| ***G06F 16/3329*** | (2025.01) |
| ***G06F 21/62*** | (2013.01) |
| ***G06N 20/00*** | (2019.01) |

(52) U.S. Cl.

CPC ...... *G06F 16/33295* (2025.01); *G06F 16/258* (2019.01); *G06F 16/3347* (2019.01); *G06F 21/62* (2013.01); *G06N 20/00* (2019.01)

(58) Field of Classification Search

None

See application file for complete search history.

(56) References Cited

U.S. PATENT DOCUMENTS

| | | | | |
|---|---|---|---|---|
| 12,306,828 | B1 * | 5/2025 | Chakraborty | G06F 16/212 |
| 12,353,469 | B1 * | 7/2025 | Mahabadi | G06F 16/332 |
| 2022/0329328 | A1 * | 10/2022 | Paulraj | G06N 20/00 |
| 2025/0265361 | A1 * | 8/2025 | Wen | G06F 21/6218 |
| 2026/0064874 | A1 * | 3/2026 | Mirji | G06F 21/6227 |

* cited by examiner

*Primary Examiner* — Nafiz E Hoque

(74) *Attorney, Agent, or Firm* — Amin, Turocy & Watson, LLP

(57) ABSTRACT

Query response generation using a large language model based on structured data and unstructured data (e.g., using a computerized tool), is enabled. For example, a system can comprise at least one processor, and at least one memory that stores executable instructions that, when executed by the at least one processor, facilitate performance of operations. The operations can comprise updating a metadata repository, wherein the metadata repository comprises first metadata representative of structured data of a data system and second metadata representative of unstructured data of the data system, based on the metadata repository, updating a large language model (LLM), wherein updating the LLM comprises retraining the LLM, in response to receiving a query, determining, using the first metadata representative of structured data and the second metadata representative of unstructured data of the data system, data, from the data system, applicable to the query, and generating a response to the query.

20 Claims, 10 Drawing Sheets

QUERY RESPONSE GENERATION USING A LARGE LANGUAGE MODEL BASED ON STRUCTURED DATA AND UNSTRUCTURED DATA

BACKGROUND

Data systems play an important role in artificial intelligence ecosystems, for instance, because they enable efficient data processing, management, and utilization. A typical data system comprises multiple layers, including storage, data management, and data products. Despite some existing data management solutions, data systems still require significant manual effort to transform raw data into actionable insights.

The above-described background relating to data systems is merely intended to provide a contextual overview of some current issues and is not intended to be exhaustive. Other contextual information may become further apparent upon review of the following detailed description.

DETAILED DESCRIPTION

Figure 1:
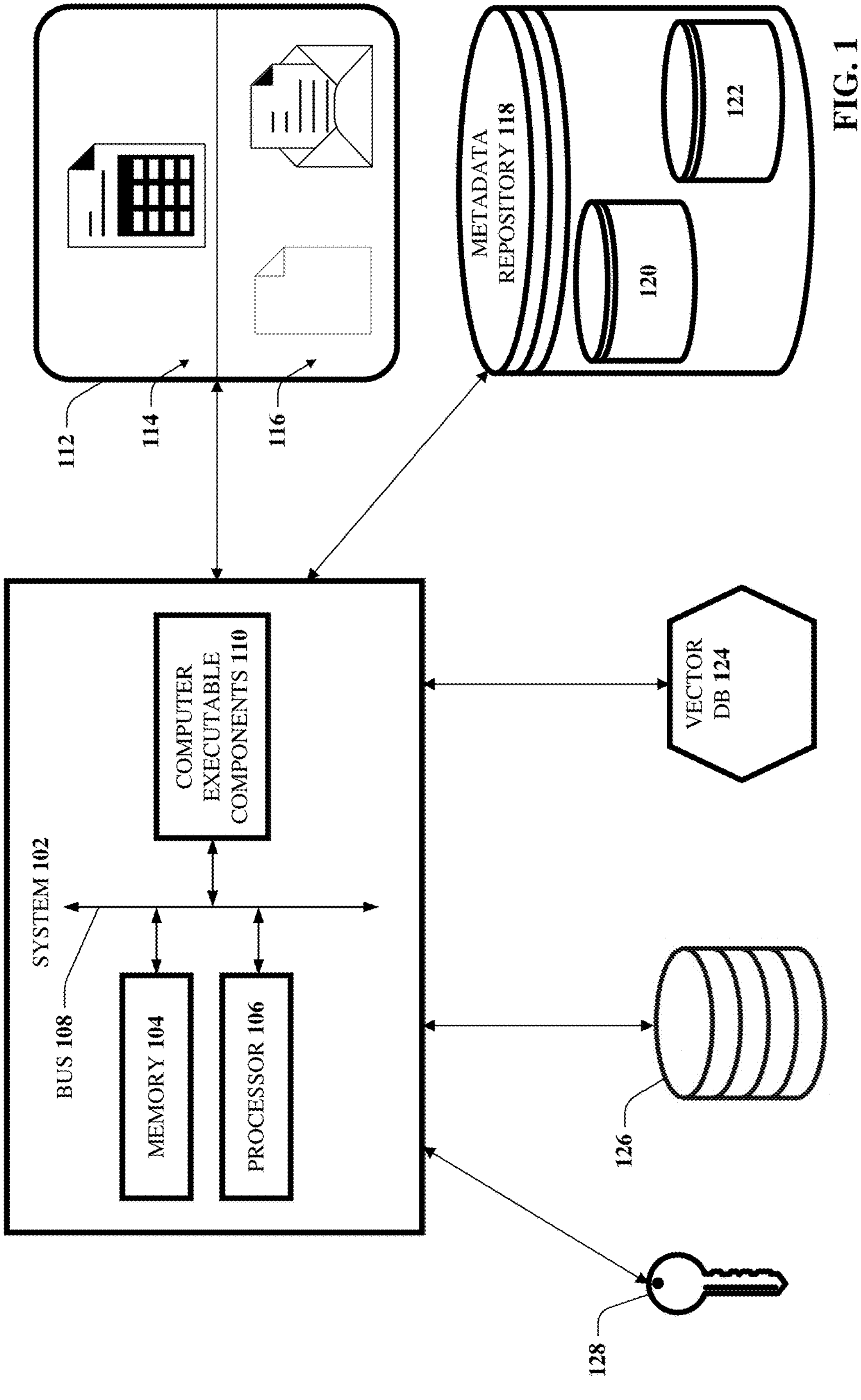
FIG. 1 is a block diagram of a non-limiting example system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, data system insight generation can be improved in various ways, and various example embodiments are described herein to this end and/or other ends.

According to an example embodiment, a system can comprise at least one processor, and at least one memory that stores executable instructions that, when executed by the processor, facilitate performance of operations, comprising updating a metadata repository, wherein the metadata repository comprises first metadata representative of structured data of a data system and second metadata representative of unstructured data of the data system, based on the metadata repository, updating a large language model, wherein updating the large language model comprises retraining the large language model, in response to receiving a query, determining, using the first metadata representative of structured data and the second metadata representative of unstructured data of the data system, data, from the data system, applicable to the query, and generating a response to the query, wherein the response is generated using the large language model based on the data determined to be applicable to the query.

In one or more example embodiments, the above operations can further comprise repeatedly transforming the unstructured data of the data system into a defined data format, resulting in transformed data, wherein the second metadata representative of unstructured data of the data system is updated based on the transformed data.

In one or more example embodiments, the above operations can further comprise determining an authorization token associated with the query, wherein the response is generated in response to a determination that the authorization token comprises an authorization to access the data determined to be applicable to the query.

In one or more example embodiments, the above operations can further comprise determining an authorization token associated with the query, and in response to a determination that the authorization token does not comprise an authorization to access the data determined to be applicable to the query, determining alternate data, from the data system, applicable to the query, wherein the authorization token is determined to comprise authorization to access the alternate data.

In one or more example embodiments, the above operations can further comprise determining a first authorization token associated with the query, and in response to a determination that the first authorization token does not comprise an authorization to access the data determined to be applicable to the query, requesting a second authorization token to access the data determined to be applicable to the query, wherein the second authorization token comprises the authorization to access the data determined to be applicable to the query, and wherein the response is generated in response to receiving the second authorization token.

In one or more example embodiments, the generating of the response to the query can comprise querying, using structured query language, the structured data of the data system, and the response to the query can be further generated based on a response to the querying using the structured query language.

In one or more example embodiments, the generating of the response to the query can comprise preparing, using retrieval augmented generation, the unstructured data, resulting in prepared data, and based on the prepared data, searching for relevant vectors relevant to the prepared data from an associated vector database, wherein the vector database comprises embedding vectors that have been translated from natural language in the unstructured data.

In one or more example embodiments, the above operations can further comprise, in response to a determination that the query comprises a request for a prediction, performing time series forecasting based on the structured data of the data system and the unstructured data of the data system, wherein the response to the query is further generated based on the time series forecasting.

In one or more example embodiments, the response to the query can be further generated based on one or more prior queries, from before the query was received, and the one or more prior queries and the query can originate from a common user entity.

In another example embodiment, a non-transitory machine-readable medium can comprise executable instructions that, when executed by a processor, facilitate performance of operations, comprising repeatedly updating a metadata database, wherein the metadata database comprises first metadata representative of structured data of a data storage system and second metadata representative of unstructured data of the data storage system, based on the metadata database, updating a large language model, wherein updating the large language model comprises training the large language model, in response to receiving an information request, determining, using the first metadata representative of structured data and the second metadata representative of unstructured data of the data storage system, data, from the storage data system, applicable to the information request, and generating an answer to the information request, wherein the answer is generated using the large language model based on the data determined to be applicable to the information request.

In one or more example embodiments, the data storage system can comprise an item database, and the structured data and the unstructured data can comprise attributes applicable to one or more items represented in the item database.

In one or more example embodiments, the above operations can further comprise the operations further comprise determining at least one data redundancy in the structured data and the unstructured data, wherein the repeatedly updating of the metadata database is performed based on the at least one data redundancy.

In one or more example embodiments, the unstructured data can comprise text-based documents and images.

In one or more example embodiments, the structured data can be structured according to a defined format natively compatible with the large language model.

In one or more example embodiments, the information request can comprise an audio-based information request, an image-based information request, a video-based information request, or a text-based information request.

In yet another example embodiment, a method can comprise updating by a system comprising at least one processor, metadata, wherein the metadata is representative of structured data of a data system and is representative of unstructured data of the data system, based on the metadata, updating, by the system, a large language model, wherein updating the large language model comprises retraining the large language model, in response to receiving a query, determining, by the system, using the metadata, data, from the data system, applicable to the query, and generating, by the system, a response to the query, wherein the response is generated using the large language model based on data determined to be applicable to the query.

In one or more example embodiments, the above method can further comprise transforming, by the system, the unstructured data of the data system into a unified data format, resulting in transformed data, wherein the metadata representative of unstructured data of the data system is updated based on the transformed data.

In one or more example embodiments, the above method can further comprise determining, by the system, an access token associated with the query, wherein the response is generated in response to a determination that the access token comprises an authorization to access the data determined to be applicable to the query.

In one or more example embodiments, the generating of the response to the query can comprise preparing, using retrieval augmented generation, the unstructured data, resulting in prepared data, and searching for applicable vectors, applicable to the prepared data, from an associated vector database, wherein the vector database comprises embedding vectors that have been translated from natural language of the unstructured data.

In one or more example embodiments, the data system can comprise a product database, and the structured data and the unstructured data can comprise attributes applicable to one or more products represented in the product database.

Embodiments herein enable a system that utilizes a large language model and can operate as an orchestrator. Embodiments herein can register various interfaces within a corresponding data system (e.g., as processes or computerized tools). Via a system herein, a user (e.g., user entity) is enabled to describe the insights that the user wants to obtain using natural language (e.g., "I'd like to see the specification changes of several versions regarding the best-selling servers from the third quarter of last year, especially focusing on CPU and GPU configurations.")

In various example embodiments, a system herein can operate as a data system administrator, in which the system herein can understand both the structured and unstructured data saved in corresponding data system, the data products and insights built on the data system, and the data processing methods that the system can provide. A system herein can enable task decomposition, in which the system herein can decompose a user's query request into smaller, manageable queries or tasks. A system herein can decide a process or tool invocation order, in which the system herein can determine the optimal sequence for invoking the registered processes or tools, and execute the processor or tools accordingly.

In various example embodiments, a system herein can determine if a problem is resolved by a system response to a query. For instance, a system herein can continuously process to resolve the user's query, supplementing system workflow with additional information from the user, if determined by the system herein to be necessary.

In various example embodiments, a system herein can control permissions. In this regard, a system herein can adhere to defined permission controls (e.g., user defined permission controls), for instance, when certain defined actions or data retrievals require authorization.

Example embodiments herein enable integration of structured and unstructured data query interfaces (e.g., as computerized tools). For instance, by defining both structured data query interfaces (e.g., SQL engines) and unstructured data retrieval interfaces (e.g., retrieval-augmented generation (RAG) models) as computerized tools, embodiments herein address the nature of data in a data system, in which the data system can contain both structured and unstructured data (e.g., mixed data types). This integration provides, for instance, a unified processing experience, enabling a system herein to generate insights seamlessly from both structured and unstructured data.

Example embodiments herein enable dynamic asset monitoring (e.g., for system state querying). By enabling dynamic asset monitoring (e.g., via a system herein) (e.g., as a computerized tool), embodiments herein solve the issues related to data virtualization and cost efficiency. Dynamic asset monitoring herein maintains an updated state of the data system, enabling the system herein to access current information on existing insights, data products, and/or accelerated queries. This dynamic asset monitoring optimizes, for instance, resource usage and prevents redundant work.

Example embodiments herein enable permission management (e.g., via a chain of authority). For instance, embodiments herein can enable a chain of authority approach to permission management, embedding user permissions in each request handled by the system herein. This ensures, for instance, that the system herein adheres to defined permissions for data queries, method usage, and/or system operations. If determined to be necessary, the system herein can request additional authorization from the user, ensuring secure and flexible permission control.

Turning now to FIG. 1, there is illustrated an example, non-limiting system 102 in accordance with one or more example embodiments herein. System 102 can comprise a computerized tool, which can be configured to perform various operations relating to query response generation using a large language model based on structured data and unstructured data. The system 102 can comprise one or more of a variety of components, such as memory 104, processor 106, bus 108, and/or computer executable components 110. In various example embodiments, one or more of the memory 104, processor 106, bus 108, and/or computer executable components 110 can be communicatively or operably coupled (e.g., over a bus or wireless network) to one another to perform one or more functions of the system 102. In various example embodiments, the system 102 can further comprise and/or be communicatively coupled to data system 112, metadata repository 118, vector database (DB) 124, large language model 126, and/or authorization token 128.

Figure 2:
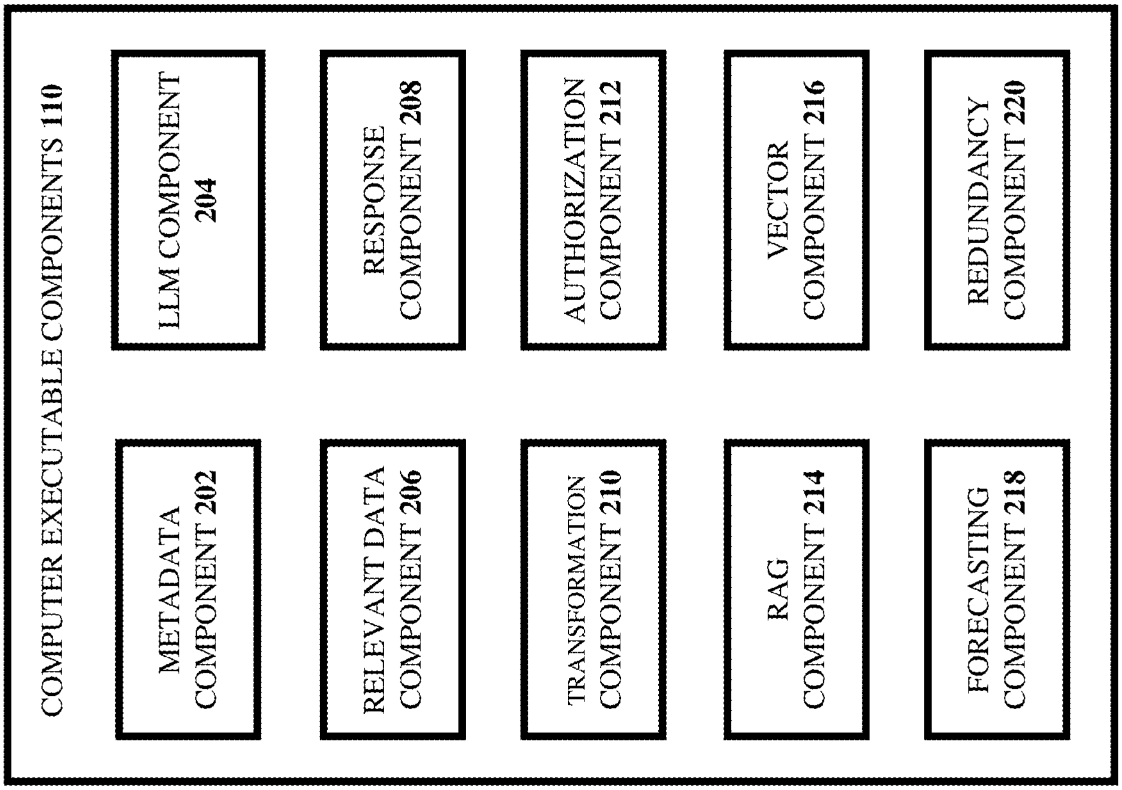
FIG. 2 is a block diagram of a non-limiting example computer executable modules in accordance with one or more example embodiments described herein.

FIG. 2 illustrates a block diagram of example, non-limiting computer executable components 110 that can facilitate query response generation using a large language model based on structured data and unstructured data in accordance with one or more embodiments described herein. Repetitive description of like elements employed in other embodiments described herein is omitted for sake of brevity. As shown in FIG. 2, the one or more computer executable components 110 can comprise the metadata component 202, large language model (LLM) component 204, relevant data component 206, response component 208, transformation component 210, authorization component 212, RAG component 214, vector component 216, forecasting component 218, and/or redundancy component 220. It is noted that while various components described herein can perform one or more corresponding functions, processes, or actions, the computer executable components 110 as a whole and/or the processor 106 can be configured to perform one or more of the described functions, processor, or actions.

According to an example embodiment, the metadata component 202 can update a metadata repository 118. In various example embodiments, the metadata repository can comprise first metadata (structured metadata 120) representative of structured data 114 of a data system 112 and second metadata (e.g., unstructured metadata 122) representative of unstructured data 116 of the data system 112. In various example embodiments, the unstructured data can comprise text-based documents, images, audio, and/or video data. Such text-based documents can comprise, for instance, emails, notes, engineering files, word processor documents, spreadsheets, portable document format (PDF) documents, presentation files, mark-up language documents, e-book formats, project management documents, or other suitable text-based documents. In various example embodiments, the structured data can be structured according to a defined format natively compatible with the large language model. Such a defined format can comprise, for instance, tabular data, relational data, hierarchical data, key-value pairs, multidimensional data, time series data, graph data, geospatial data, categorical data, enumerations, flat file data, object-oriented data, network data, or other suitable structured data.

In various example embodiments, the data system 112 can comprise an item database (e.g., a product database). In this regard, the structured data 114 and the unstructured data 116 can comprise attributes applicable to one or more items (e.g., products) represented in the item database (e.g., in the data system 112). For example, consider a central processing unit (CPU) as the above item (e.g., product). Attributes of the CPU can comprise clock speed (frequency), number of cores, number of threads, cache, architecture, instruction set, thermal design power, fabrication size, socket type, integrated graphics, power consumption, overclocking capabilities, bus speed, multithreading performance, security features, or other suitable attributes. It is noted that the item (e.g., product) can comprise virtually any item, and such attributes can be respectively according to the item in the item database herein.

According to an example embodiment, the LLM component 204 can, based on the metadata repository 118, update a large language model 126. In this regard, updating (e.g., via the LLM component 204) the large language model 126 can comprise retraining the large language model 126. By retraining the large language model 126, with the metadata of the metadata repository 118, the large language model 126 can be improved in performance and accuracy, for instance, by increasing generalization, reducing bias and error, and increasing domain-specific expertise. Further, by retraining the large language model 126, the large language model 126 can be adapted to new data contained in the metadata repository 118. The foregoing can also increase efficiency and resource usage of the large language model 126. To train the large language model 126 (e.g., via the LLM component 204), the LLM component 204 can pre-process the metadata of the metadata repository 118, which can comprise text tokenization, cleaning of the metadata, normalization of the metadata, and/or shuffling and batching of the metadata. In some embodiments, LLM component 204 can train the large language model 126 using supervised learning, while in other embodiments, the LLM component 204 can train the large language model 126 using unsupervised learning or semi-supervised learning.

According to an example embodiment, the relevant data component 206 can, in response to receiving a query, determine, using the first metadata (structured metadata 120) representative of structured data 114 and the second metadata (e.g., unstructured metadata 122) representative of unstructured data 116 of the data system 112, data, from the data system 112, applicable to the query. In this regard, the data in the data system 112 associated with the metadata (e.g., structured metadata 120 and/or unstructured metadata 122) can be determined by the relevant data component 206. In various example embodiments, a query herein can comprise an audio-based information query, an image-based information query, a video-based information query, or a text-based information query. For example, a text-based query herein can comprise the input (e.g., to the system 102) of written words, phrases, or sentences to search for relevant information. An audio-based query herein can comprise spoken language input, which can be processed (e.g., via the system 102) to retrieve relevant information. An image-based query herein enables users of the system 102 to submit an image as input, which the system 102 can then process to retrieve information corresponding to the content of the image. A video-based query herein enables users to submit a video as input or search within videos for relevant content, such as scenes, objects, or specific actions.

Figure 3:
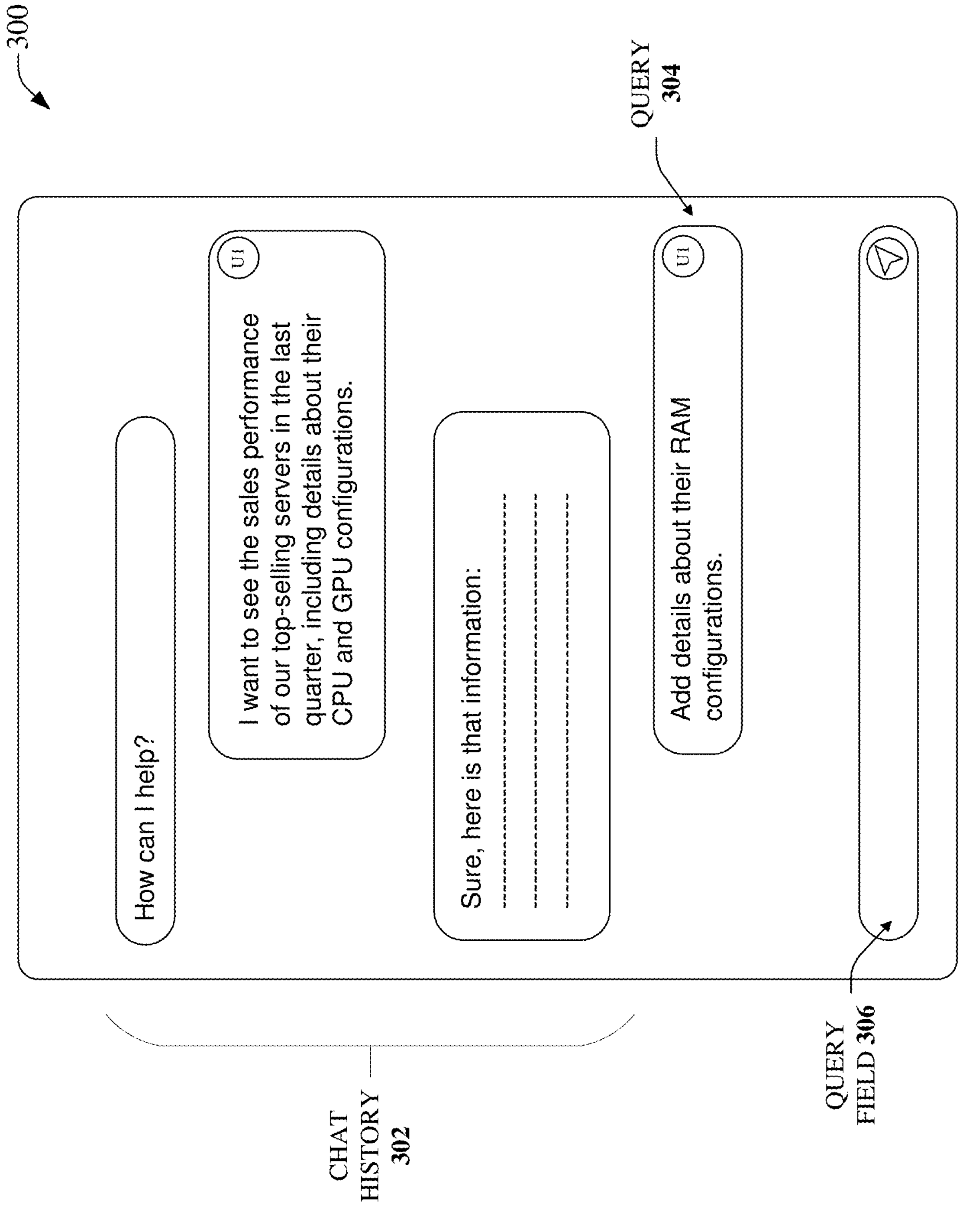
FIG. 3 is a diagram of an example user interface (UI) in accordance with one or more example embodiments described herein.

According to an example embodiment, the response component 208 can generate a response to the query. Typically, the response to the query can be a text-based response as depicted in FIG. 3. However, as discussed above, embodiments herein are not limited to text-based responses. For instance, such responses can additionally, or alternatively, be audio-based, picture-based, and/or video-based. In this regard, the response can be generated by the response component 208 using the large language model 126 based on the data determined to be applicable to the query. For example, a query herein can comprise a request for attributes about a particular CPU in an item database associated with the system 102. In this example, the response can comprise one or more of corresponding clock speed (frequency), number of cores, number of threads, cache, architecture, instruction set, thermal design power, fabrication size, socket type, integrated graphics, power consumption, overclocking capabilities, bus speed, multithreading performance, security features, or other suitable attributes. In various example embodiments, the generating (e.g., via the response component 208) of the response to the query can comprise querying, using structured query language (SQL), the structured data of the data system 112. In this regard, the response to the query can be further generated (e.g., via the response component 208) based on a response to the querying using the SQL (e.g., a standardized programming language for managing and manipulating relational databases). In various example embodiments, the response to the query herein can be further generated, for instance, based on one or more prior queries (e.g., chat history), from before the query (e.g., a current query) was received. In this regard the one or more prior queries (e.g., chat history) and the query (e.g., a current query) can originate from a common user entity (e.g., U1), though in other embodiments, chat history from multiple user entities can be aggregated for analysis by the system 102 herein when generating a response to a query.

According to an example embodiment, the transformation component 210 can repeatedly transform the unstructured data 116 of the data system 112 into a defined data format, resulting in transformed data (e.g., transformed data 402). Transforming (e.g., via the transformation component 210 of the unstructured data 116 into transformed data can comprise, for instance, one or more of a variety of steps, such as data identification and collection, preprocessing and data cleansing, tokenization, natural language processing (NLP), feature extraction, structuring the data, use of machine learning models, and/or data storage in a structured format, among other suitable steps. The foregoing transformation (e.g., via the transformation component 210) can transform the unstructured data into a defined schema, such as into rows and columns of data in the data system 112. In this regard, the second metadata (e.g., unstructured metadata 122) representative of unstructured data 116 of the data system 112 can be updated (e.g., via the metadata component 202) based on the transformed data.

According to an example embodiment, the authorization component 212 can determine an authorization token 128 associated with the query. Such an authorization token 128 can be associated with a query and/or a user of the system 102. The authorization token 128 can comprise, for instance, a piece of data used to verify that a user or system has permission to access particular data of the data system 112. In various example embodiments, the authorization token 128 can comprise one or more of a bearer token, JavaScript object notation (JSON) web token, Oauth token, or another suitable authorization token 128. Implementation of the authorization token 128 can prevent unauthorized access to data stored in the data system 112, thus promoting data security. In various example embodiments, a response to the query herein can be generated (e.g., via the response component 208) in response to a determination (e.g., via the authorization component 212) that the authorization token 128 comprises an authorization to access the data determined to be applicable to the query. This ensures that the system 102 cannot be utilized as a vehicle to access unauthorized data on the data system 112.

In another example embodiment, the authorization component 212 and/or the LLM component 204 can, in response to a determination (e.g., via the authorization component 212) that the authorization token 128 does not comprise an authorization to access the data determined to be applicable to a query herein, determine alternate data, from the data system 112, applicable to the query. In this regard, the authorization token 128 can be determined (e.g., via the authorization component 212) to comprise authorization to access the alternate data. In further example embodiments, the authorization component 212 can, in response to a determination that a first authorization token (e.g., authorization token 128) does not comprise an authorization to access the data determined to be applicable to the query herein, request a second authorization token (e.g., similar to the authorization token 128) to access the data determined to be applicable to the query. In this regard, the second authorization token can comprise the authorization to access the data determined to be applicable to the query herein, and a corresponding response to the query can be generated (e.g., via the response component 208) in response to receiving the second authorization token.

In various example embodiments, the authorization component 212 can ensure that all actions and data access requests performed by the LLM component 204, or other components of the system 102 herein, comply with user-specific permissions. In various example embodiments, the LLM component 204 and/or authorization component 212 can verify the identity of the user (e.g., based on user identity credentials) and check against predefined permissions (e.g., via an authorization token 128) before any process or tool invocation or data access (e.g., a chain of authority). In various example embodiments, the authorization component 212 can enable user authentication, which can comprise identity verification (e.g., when a user logs in, their identity is verified through standard authentication mechanisms (e.g., username/password, multi-factor authentication)) and/or token generation (e.g., upon successful login, a unique, secure token representing the user's identity and permissions can be generated). In various example embodiments, the authorization token 128 can be embedded into each query herein or operation request facilitated by the LLM component 204. In various example embodiments, the authorization token 128 can be periodically checked (e.g., via the authorization component 212) against the permissions required for each process or tool and data access request.

Before invoking any process or tool, the LLM component 204 and/or authorization component 212 can compare a user's permissions (embedded in the authorization token 128) with the required permissions for that tool, file, or data. If a user is determined (e.g., via the authorization component 212) to lack the necessary permissions, the LLM component 204 and/or authorization component 212 can utilize LLM-based reasoning to find alternative processes to fulfill the request (e.g., utilizing alternate data, requesting a second authorization token, or another suitable alternative process). If no alternatives are viable, the LLM component 204 and/or authorization component 212 can generate a message, to the user, that the request cannot be completed (e.g., due to insufficient permissions). If additional permissions are required, the LLM component 204 and/or authorization component 212 can prompt the user to provide the necessary authorization (e.g., via an authorization token or another suitable authorization method), thus facilitating a smooth interaction between a user herein and the system 102.

According to an example embodiment, the generating (e.g., via the response component 208) of the response to the query can comprise preparing (e.g., via the RAG component 214), using retrieval augmented generation (RAG), the unstructured data 116, resulting in prepared data, and based on the prepared data, searching (e.g., via the vector component 216) for relevant vectors relevant to the prepared data from an associated vector DB 124. In various example embodiments, searching (e.g., via the RAG component 214) for relevant vectors among embedding vectors can comprise determining (e.g., via the RAG component 214) vectors that are closest to, or most similar to, a given query vector. In this regard, embedding vectors herein can represent data (e.g., text, images, or other suitable items) in a continuous vector space, in which similar items are located near each other. In various example embodiments, the vector search process can comprise a vector similarity search or nearest neighbor search (e.g., via the RAG component 214). In this regard, the vector DB 124 can comprise embedding vectors that have been translated (e.g., via the RAG component 214) from natural language in the unstructured data 116.

According to an example embodiment, the forecasting component 218 can, in response to a determination (e.g., via the LLM component 204 and/or the forecasting component 218) that the query herein comprises a request for a prediction, perform time series forecasting based on the structured data 114 of the data system 112 and the unstructured data 116 of the data system 112. Such time series forecasting (e.g., via the forecasting component 218) can comprise utilization e.g., via the forecasting component 218) of historical data (e.g., in the data system 112), collected (e.g., via the system 102) over time, to predict future values. Such time series forecasting can comprise analysis (e.g., via the forecasting component 218) of the past behavior of data points that are observed at regular intervals (e.g., hourly, daily, monthly, yearly, or other suitable intervals), and then applying (e.g., via the forecasting component 218) statistical or machine learning models to estimate future outcomes. The time series data herein is unique, for instance, because the temporal ordering of data points matters. In this regard, future values herein can be influenced by past observations (e.g., via the forecasting component 218) herein. Components of time series forecasting (e.g., via the forecasting component 218) can comprise, for instance, trends, seasonality, cyclic patterns, and/or noise. Trends herein can comprise to long-term movements in the data (e.g., an upward trend in sales over years). Seasonality herein can comprise repeating patterns (e.g., higher sales during holiday seasons), that occur at regular intervals. Cyclic patterns herein can comprise irregular fluctuations, for instance, driven by broader cycles, such as economic booms and recessions. Noise herein can comprise random variations that are not part of any clear pattern, but can obscure the true underlying trends. In various example embodiments, the forecasting component 218 can identify and model the components of the time series forecasting components to generate accurate future predictions. In this regard, the response to the query can be further generated (e.g., via the response component 208) based on the time series forecasting (e.g., via the forecasting component 218).

In various example embodiments, the redundancy component 220 can determine data redundancies (e.g., at least one data redundancy) in the structured data 114 and the unstructured data 116. For instance, the redundancy component 220 can determine data redundancies by employing one or more suitable data profiling processes and/or analyzing metadata that describes the structure and relationships in the structured data 114 and the unstructured data 116. In this regard, the redundancy component 220 can identify potential duplicate records or overlapping attributes within the data system 112. In various example embodiments, the redundancy component 220 can compare data entries (e.g., in the data system 112) across different tables, for instance, focusing on key identifiers such as primary keys, foreign keys, and/or constraints. In some example embodiments, metadata corresponding to the structured data 114 and the unstructured data 116 can be utilized (e.g., via the redundancy component 220) to assess the consistency and accuracy of data formats, thus aiding in flagging instances in which identical or similar data points exist. Once the redundancies have been identified (e.g., via the redundancy component 220), the redundancy component 220 can update a metadata repository 118 to reflect these findings and thus improve overall data management via a system 102 herein. In this regard, the redundancy component 220 and/or the metadata component 202 can modify metadata records in the metadata repository 118 to include information about duplicate data. Further in this regard, the updating (e.g., repeatedly updating) (e.g., via the metadata component 202) of the metadata repository 118 (e.g., metadata database) can be performed (e.g., via the metadata component 202) based on the at least one data redundancy.

In various example embodiments, the system 102 can enable a structured data query. In this regard, the system 102 can facilitate SQL-based queries, for instance, on structured datasets (e.g., structured data 114) stored within the data system 112. This enables a user entity herein to retrieve and/or manipulate data, for instance, using defined SQL instructions. In various example embodiments, the system 102 can be integrated with one or more SQL query engines (e.g., PostgreSQL, Starburst/Trino, or other suitable SQL query engines), for instance, to execute such queries herein. In some example embodiments, a defined text2sql (e.g., text-to-SQL) process can be first invoked, for instance, to translate natural language request to executable SQL query. In various example embodiments, the text2sql process can, for instance, convert (e.g., via a system 102 herein) natural language queries into SQL instructions. In various example embodiments, the text2sql process can, for instance, utilize an LLM-based model fine-tuned for SQL generation.

In various example embodiments, the system 102 can enable an unstructured data retrieval interface. In this regard, the system 102 can facilitate the extraction and analysis of unstructured data, such as text documents, images, videos, and/or portable document format (PDF) documents. In this regard, the system 102 can employ techniques to retrieve relevant information from unstructured sources (e.g., unstructured data 116). For instance, the system 102 can utilize the RAG component 214 and/or content parsing, which can comprise parsers for different types of unstructured data (e.g., PDF parsers). The retrieval interface (e.g., via the system 102) can first search relevant vectors from vector DB 124, and then find the corresponding unstructured data trunk (e.g., paragraphs), then return to LLM component 204. In some example embodiments, the text2embedding (e.g., text-to-embedding) process can be first invoked (e.g., via the system 102), for instance, to translate natural language request to embedding vector, so that it can be used as the query to search (e.g., via the vector component 216) the vector DB 124. The text2embedding process can, for instance, convert (e.g., via the system 102) unstructured data 116 into vector embeddings, and can support similarity searches and contextual understanding for the unstructured data 116.

In various example embodiments, the system 102 can enable data analytics functions. In this regard, the system 102 can provide defined analytical functions to perform complex data analyses. These defined analytical functions can comprise, for instance, revenue prediction, customer segmentation, anomaly detection, sentiment analysis, and/or churn analysis, among other suitable functions. In various example embodiments, the data analytics functions can comprise predefined models, which can integrate various machine learning models and/or statistical methods for specific analytical tasks. In various example embodiments, the data analytics functions can comprise a function library, which can maintain a library of predefined functions accessible, for instance, via application programming interfaces (APIs). In various example embodiments, the data analytics functions can comprise custom analysis, which can enable a user entity to define custom analytical functions using a scripting language, such as Python. In various example embodiments, the data analytics functions can comprise integration with query results, which can enable analytical functions to be applied directly to the results of structured and unstructured data queries.

In various example embodiments, the system 102 can enable continuous (e.g., dynamic) asset monitoring. In this regard, the system 102 can continuously update and reflect the state of the data system 112, including existing insights, data products, and accelerated queries. The system 102 can ensure that the LLM component 204 is aware of, and can use or reuse, existing assets (e.g., data assets). In this regard, the system 102 can comprise and/or be communicatively coupled to metadata repository 118, which can track the state and availability of data assets herein in the data system 112. In this regard, the metadata component 202 can periodically update the metadata repository 118 with the latest information. In various example embodiments, the system 102 can enable a query interface, which can enable an API for querying the current state of the data system, including available insights and accelerated queries. In various example embodiments, the system 102 can notify the LLM component 204 of changes in the data system state, such as new insights or updated data products.

In various example embodiments, the system 102 can enable data system actionable operations, which can define various operations that can be performed within the data system 112, such as creation of new data products, updating of existing products, generation of an intelligence report (e.g., a business intelligence report), and managing of materialized views. In various example embodiments, the system 102 can enable action execution, which can perform the defined operations based on user requests or system triggers. In various example embodiments, the system 102 can enable API integration, which can expose actionable operations through APIs that the LLM component 204 can invoke. In various example embodiments, the system 102 can enable workflow management, which can be enabled to handle complex sequences of operations.

FIG. 3 is a diagram of an example UI 300 in accordance with one or more example embodiments described herein. Chat history 302 can comprise chat history between a user (e.g., U1) and the system 102. In this regard, the chat history 302 can comprise chat history (e.g., a conversation thread) on a display (e.g., a computer screen, smartphone screen, tablet screen, wearable device screen, or another suitable display), which shows previous exchanges between a user entity and the system 102, thus assisting user entities by keeping track of their discussions and reference earlier messages, and helping the system 102 generate responses based on the chat history 302. In various example embodiments, the query field 306 can comprise a field in which a user (e.g., U1) can enter text, however, it is noted that audio, picture, and/or video-based content can be utilized as a query herein. In an example embodiment, the query field 306 can comprise a text input box in which a user entity can enter questions, prompts, or messages. The query field 306 can support multi-line input, thus enabling a user entity to easily compose longer queries or messages. In various embodiments, the query field 306 can comprise a send button, which can be utilized by a user entity to send the query to the system 102. In various example embodiments, the query 304 can comprise a query from a user entity (e.g., U1) to the system 102.

Figure 4:
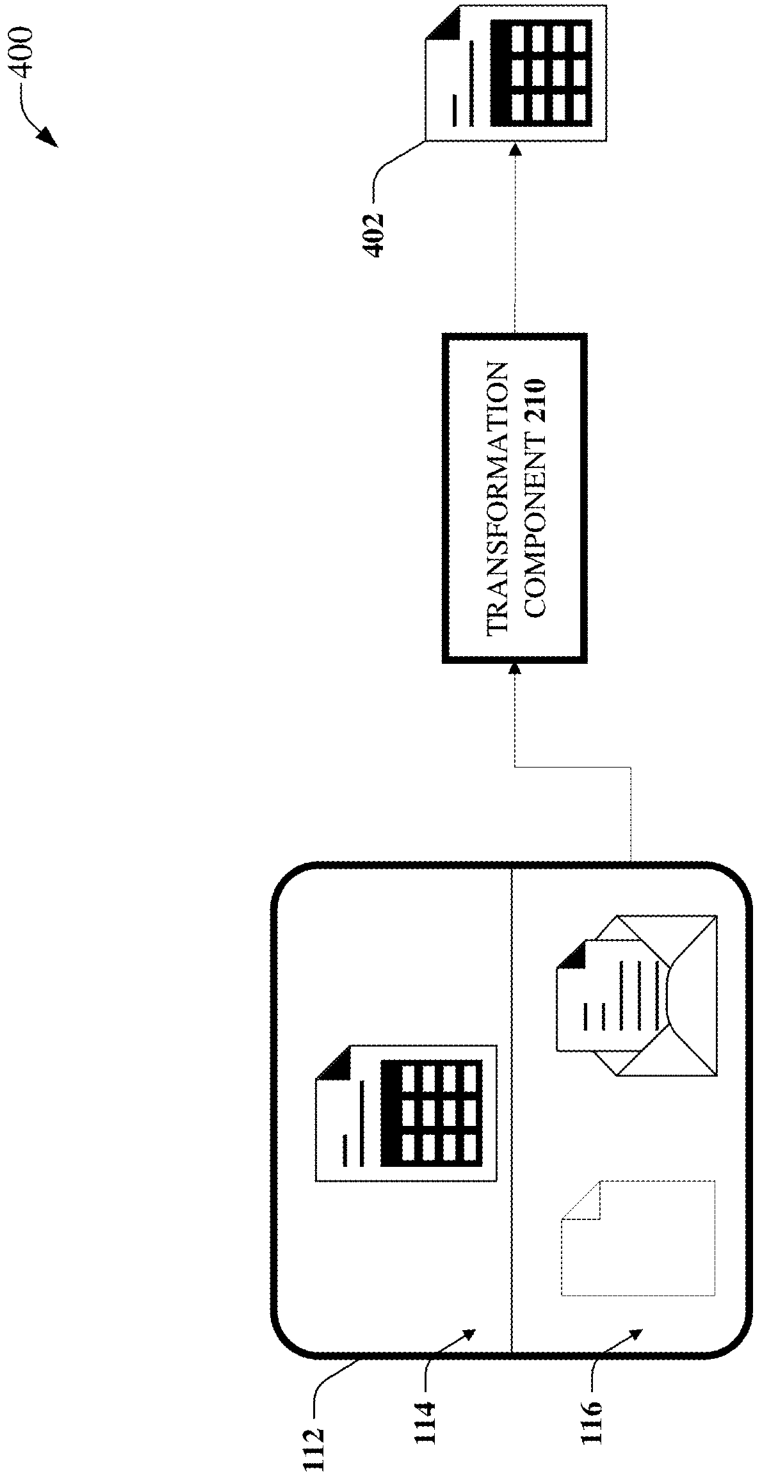
FIG. 4 is a diagram of an example unstructured data transformation in accordance with one or more example embodiments described herein.

FIG. 4 is a diagram of an example unstructured data transformation 400 in accordance with one or more example embodiments described herein. In various example embodiments, the transformation component 210 can repeatedly transform the unstructured data 116 of the data system 112 into a defined data format, resulting in transformed data 402. The transforming (e.g., via the transformation component 210) of the unstructured data 116 into the transformed data 402 can comprise, for instance, one or more of a variety of steps, such as data identification and collection, preprocessing and data cleansing, tokenization, NLP, feature extraction, structuring the data, use of machine learning models, and/or data storage in a structured format, among other suitable steps. The foregoing can transform (e.g., via the transformation component 210) the unstructured data 116 into a defined schema, such as into rows and columns of data in the data system 112. In this regard, the second metadata (e.g., unstructured metadata 122) representative of unstructured data 116 of the data system 112 can be updated (e.g., via the metadata component 202) based on the transformed data 402.

Figure 5:
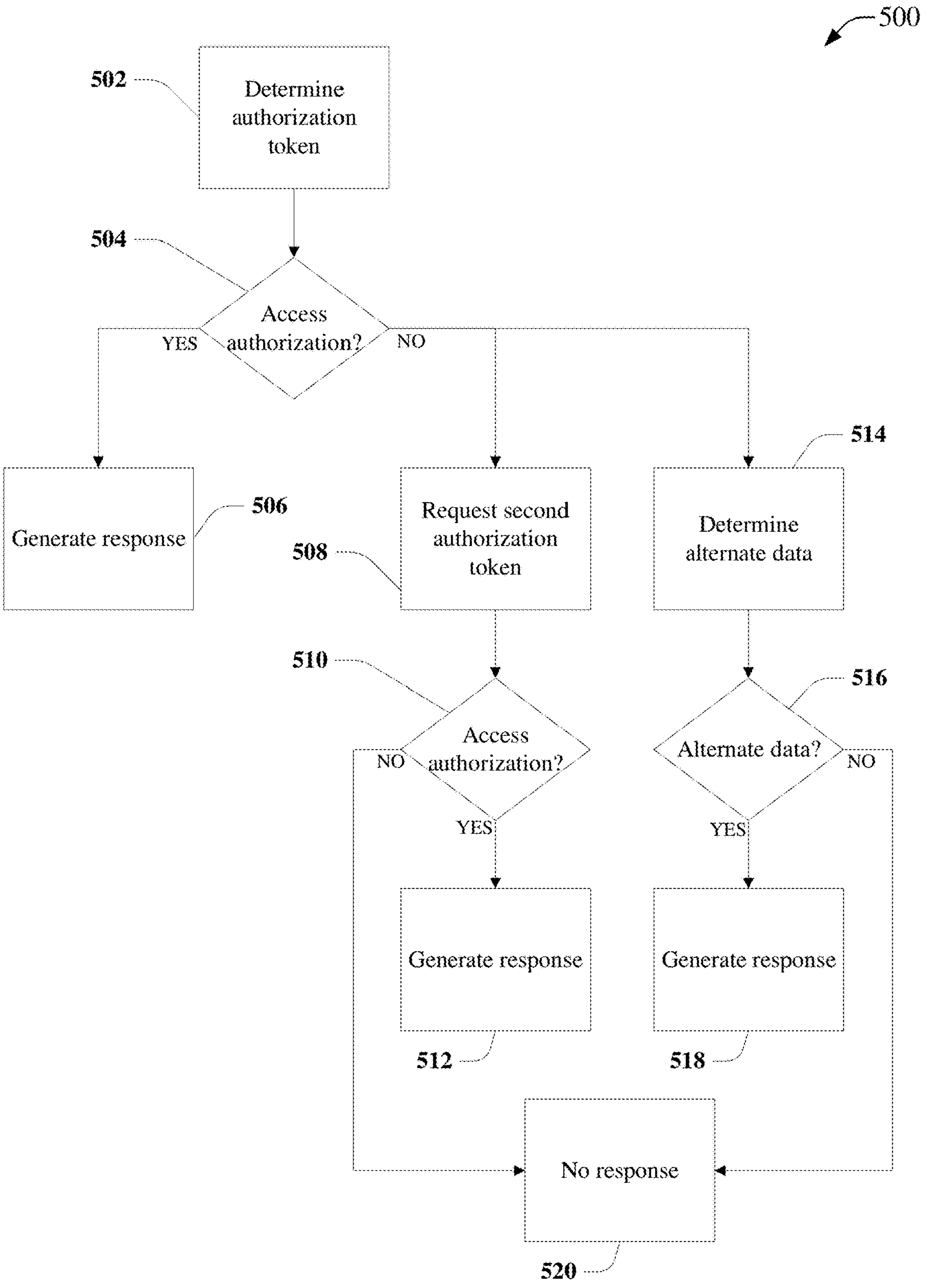
FIG. 5 is a flowchart of example authorization in accordance with one or more example embodiments described herein.

FIG. 5 is a flowchart of a process 500 associated with example authorization (e.g., via the authorization component 212) in accordance with one or more example embodiments described herein. At 502, the authorization component 212 can determine an authorization token 128 associated with a query (e.g., query 304) herein. In this regard, the authorization token 128 can comprise a piece of data used to verify that a user or system has permission to access particular data of the data system 112. In various example embodiments, the authorization token 128 can comprise one or more of a bearer token, JSON web token, Oauth token, or another suitable authorization token. At 504, the authorization component 212 can determine whether the authorization token 128 comprises an authorization to access the data determined to be applicable to the query. If the authorization token 128 comprises an authorization to access the data determined to be applicable to the query (YES at 504), the process can proceed to 506, at which the response component 208 can generate a response to the query. If, at 504, the authorization token 128 does not comprise an authorization to access the data determined to be applicable to the query (NO at 504), the process 500 can proceed to 508 and/or 514.

At 508, the authorization component 212 can request a second authorization token to access the data determined to be applicable to the query. At 510, the authorization component 212 can determine whether the second authorization token comprises access to the data determined to be applicable to the query. At 510, if the second authorization token comprises access to the data determined to be applicable to the query (YES at 510), the process 500 can proceed to 512, at which at which the response component 208 can generate a response to the query. If, at 510, the second authorization token does not comprise access to the data determined to be applicable to the query (NO at 510), the process 500 can proceed to 520, at which a response to the query is not generated by the response component 208.

At 514, the authorization component 212 can determine alternate data, from the data system 112, applicable to the query. At 516, the authorization component 212 can determine whether the authorization token comprises access to the alternate data. At 516, if the authorization token comprises access to the alternate data (YES at 516), the process 500 can proceed to 518, at which at which the response component 208 can generate a response to the query. If, at 516, the authorization token does not comprise access to the alternate data (NO at 516), the process 500 can proceed to 520, at which a response to the query is not generated by the response component 208.

Figure 6:
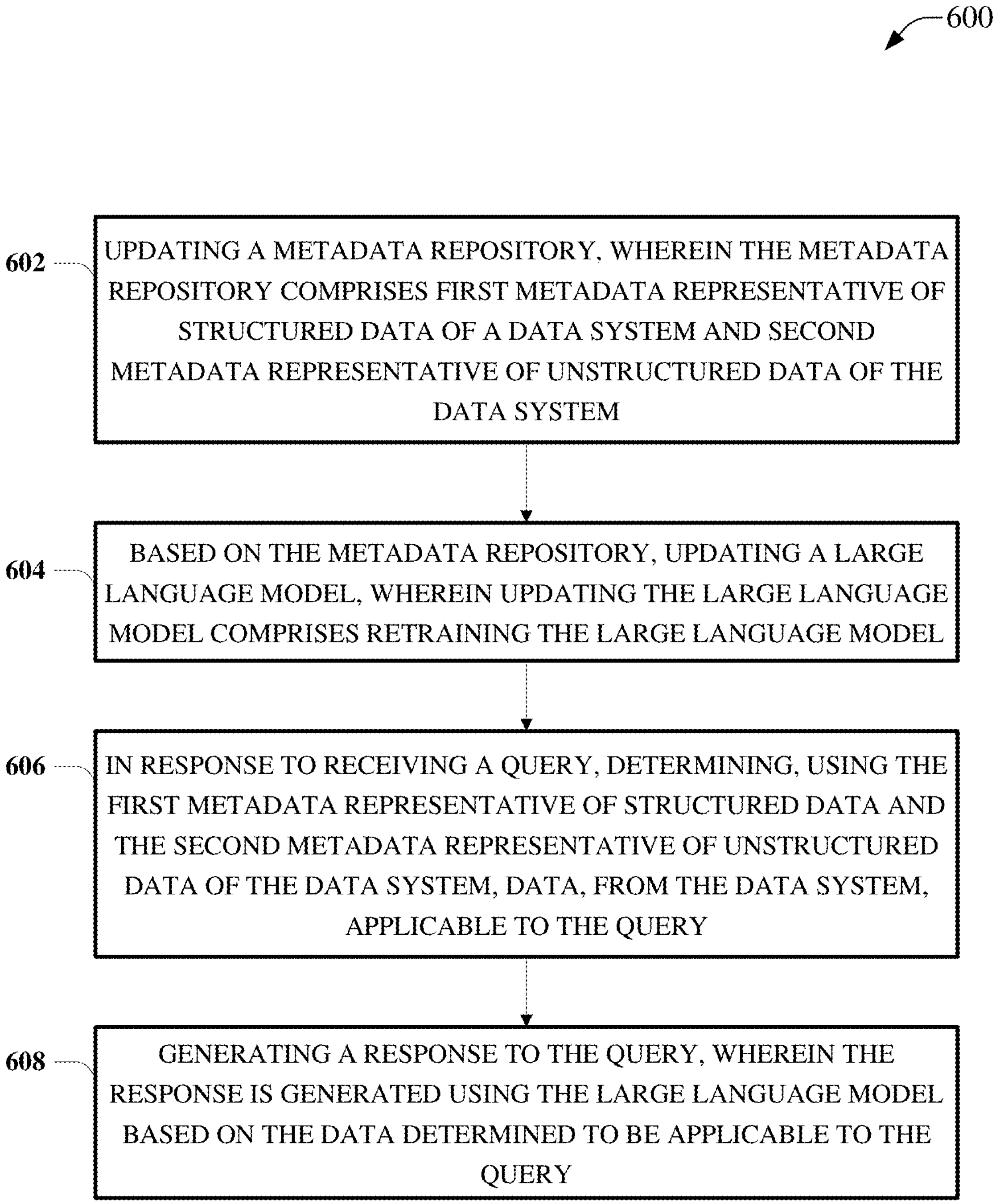
FIG. 6 is a flow diagram for a process associated with query response generation using a large language model based on structured data and unstructured data in accordance with one or more example embodiments described herein.

FIG. 6 illustrates a flow diagram for a process 600 associated with query response generation using a large language model based on structured data and unstructured data in accordance with one or more embodiments described herein. At 602, the process 600 can comprise updating (e.g., via the metadata component 202) a metadata repository 118, wherein the metadata repository 118 comprises first metadata (structured metadata 120) representative of structured data 114 of a data system 112 and second metadata (e.g., unstructured metadata 122) representative of unstructured data 116 of the data system 112. At 604, the process 600 can comprise, based on the metadata repository 118, updating (e.g., via the LLM component 204) a large language model 126, wherein updating the large language model 126 comprises retraining the large language model 126. At 606, the process 600 can comprise, in response to receiving a query, determining (e.g., via the relevant data component 206), using the first metadata (structured metadata 120) representative of structured data 114 and the second metadata (e.g., unstructured metadata 122) representative of unstructured data 116 of the data system 112, data, from the data system 112, applicable to the query. At 608, the process 600 can comprise generating (e.g., via the response component 208) a response to the query, wherein the response is generated (e.g., via the response component 208) using the large language model 126 based on the data determined to be applicable to the query.

Figure 7:
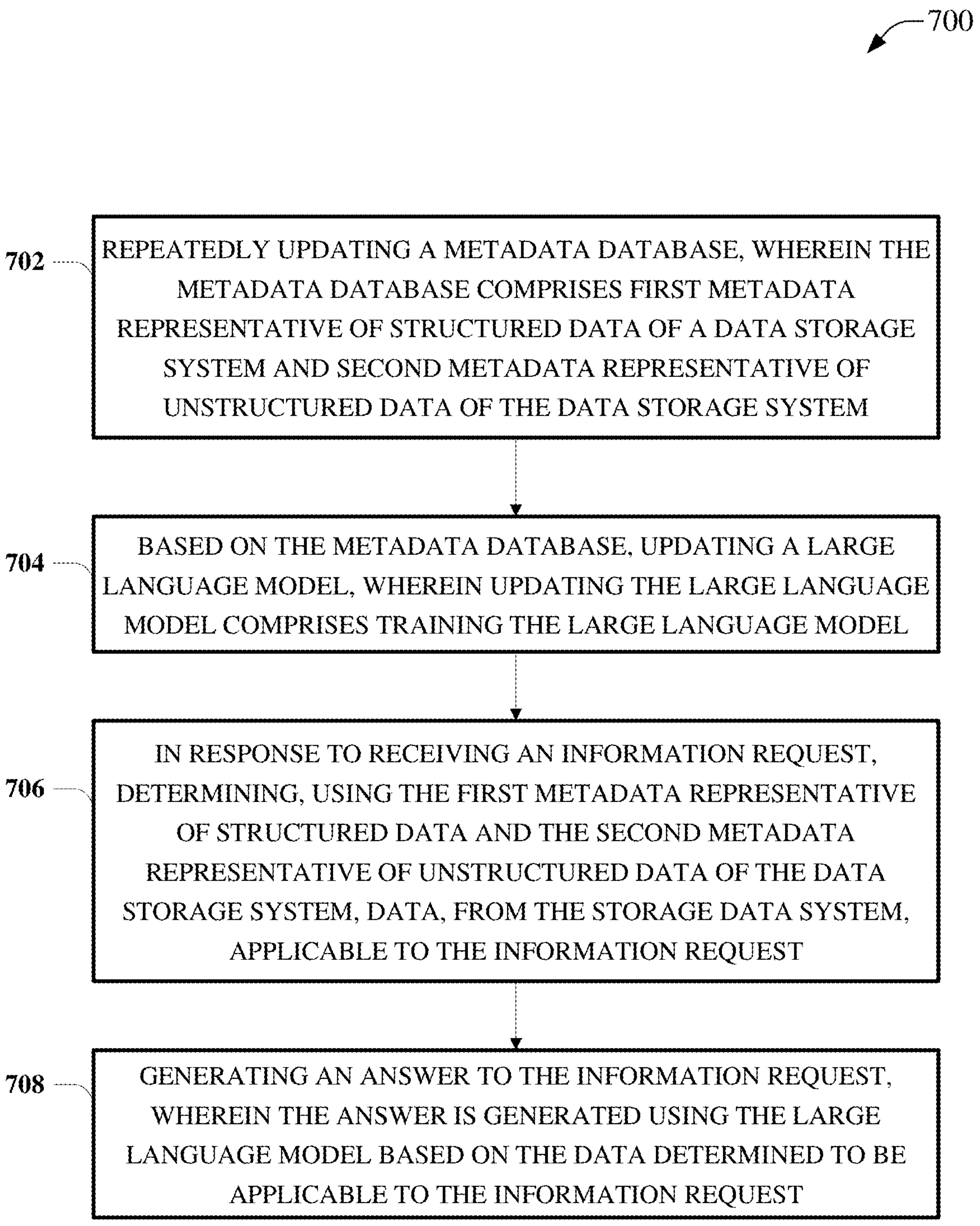
FIG. 7 is a flow diagram for a process associated with query response generation using a large language model based on structured data and unstructured data in accordance with one or more example embodiments described herein.

FIG. 7 illustrates a flow diagram for a process 700 associated with query response generation using a large language model based on structured data and unstructured data in accordance with one or more embodiments described herein. At 702, the process 700 can comprise repeatedly updating (e.g., via the metadata component 202) a metadata database (e.g., metadata repository 118), wherein the metadata database (e.g., metadata repository 118) comprises first metadata (structured metadata 120) representative of structured data 114 of a data storage system (e.g., data system 112) and second metadata (e.g., unstructured metadata 122) representative of unstructured data 116 of the data storage system (e.g., data system 112). At 704, the process 700 can comprise, based on the metadata database, updating (e.g., via the LLM component 204) a large language model 126, wherein updating the large language model 126 comprises training the large language model 126. At 706, the process 700 can comprise, in response to receiving an information request, determining (e.g., via the relevant data component 206), using the first metadata (structured metadata 120) representative of structured data 114 and the second metadata (e.g., unstructured metadata 122) representative of unstructured data 116 of the data storage system (e.g., data system 112), data, from the storage data system (e.g., data system 112), applicable to the information request. At 708, the process 700 can comprise generating (e.g., via the response component 208) an answer to the information request, wherein the answer is generated (e.g., via the response component 208) using the large language model 126 based on the data determined to be applicable to the information request.

Figure 8:
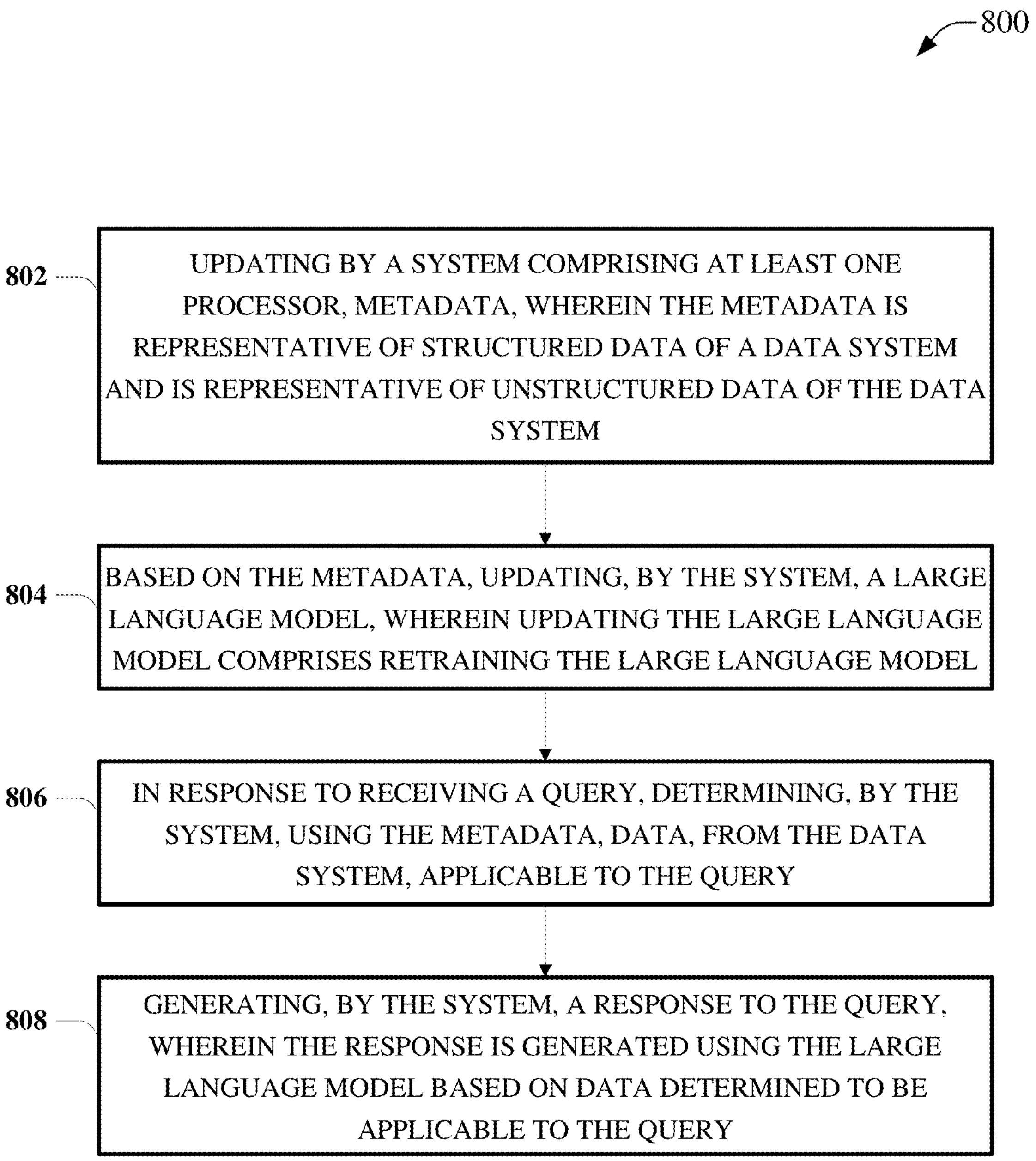
FIG. 8 is a flow diagram for a process associated with query response generation using a large language model based on structured data and unstructured data in accordance with one or more example embodiments described herein.

FIG. 8 illustrates a flow diagram for a process 800 associated with query response generation using a large language model based on structured data and unstructured data in accordance with one or more embodiments described herein. At 802, the process 800 can comprise updating (e.g., via the metadata component 202) by a system 102 comprising at least one processor 106, metadata (e.g., in the metadata repository 118), wherein the metadata is representative of structured data 114 of a data system 112 and is representative of unstructured data 116 of the data system 112. At 804, the process 800 can comprise, based on the metadata, updating (e.g., via the LLM component 204), by the system 102, a large language model 126, wherein updating the large language model 126 comprises retraining the large language model 126. At 806, the process 800 can comprise, in response to receiving a query, determining (e.g., via the relevant data component 206), by the system 102, using the metadata, data, from the data system 112, applicable to the query. At 808, the process 800 can comprise generating (e.g., via the response component 208), by the system 102, a response to the query, wherein the response is generated (e.g., vi the response component 208) using the large language model 126 based on data determined to be applicable to the query.

Figure 9:
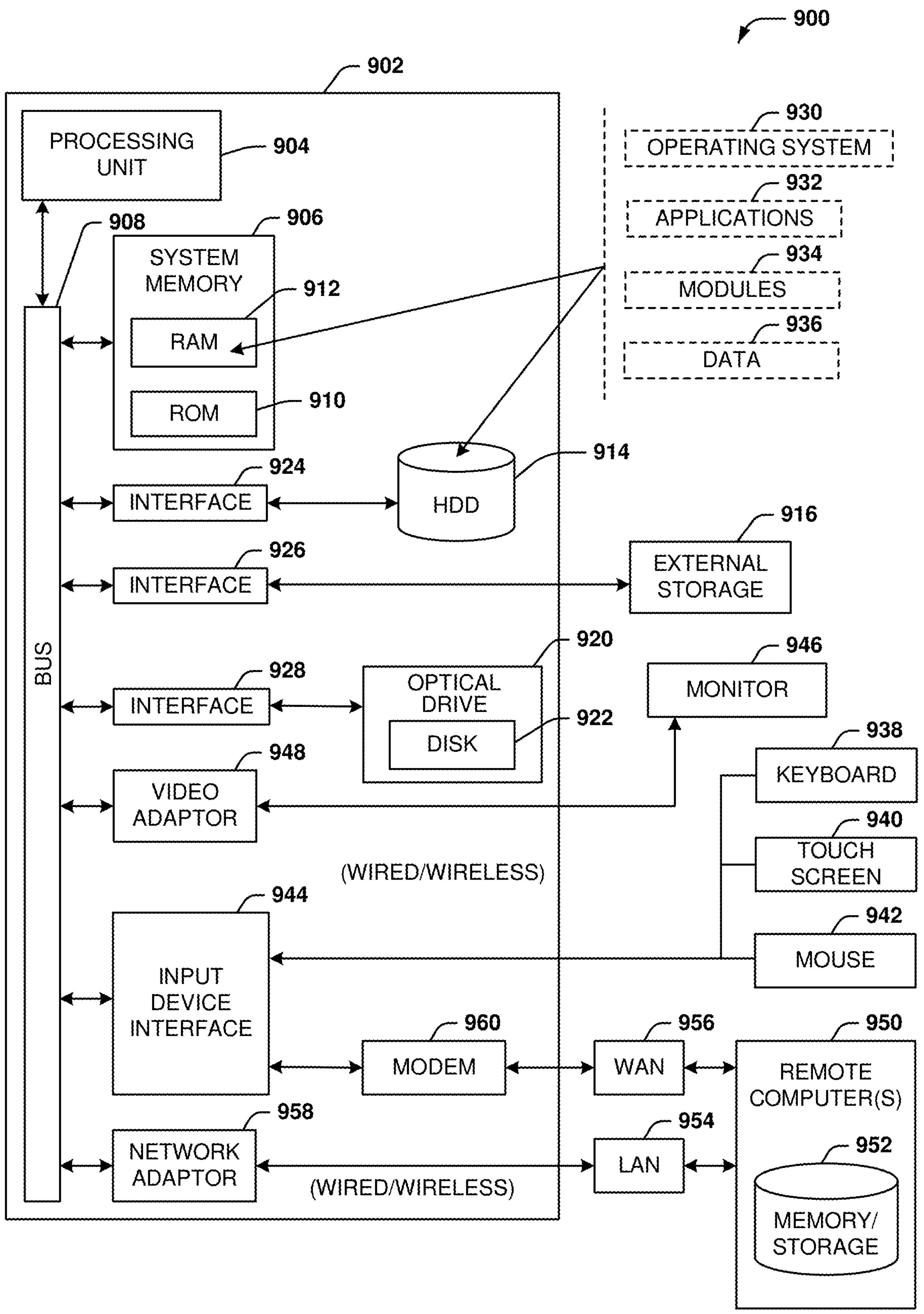
FIG. 9 is an example, non-limiting computing environment in which one or more embodiments described herein can be implemented.

In order to provide additional context for various example embodiments described herein, FIG. 9 and the following discussion are intended to provide a brief, general description of a suitable computing environment 900 in which the various example embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, modules, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various example embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer

902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
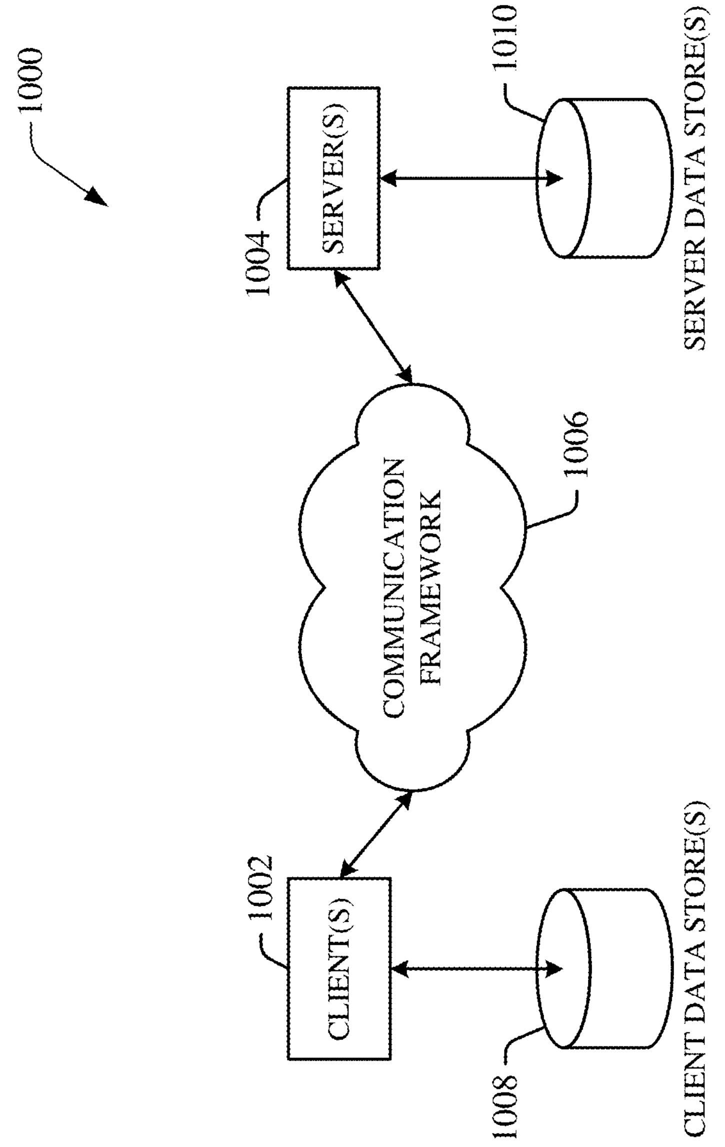
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various example embodiments. It is, of course, not possible to describe every conceivable combination of components, modules, or methods for purposes of describing the disclosed subject matter, and one skilled in the art may recognize that further combinations and permutations of the various example embodiments are possible. The disclosed subject matter is intended to embrace all such alterations, modifications, and variations that fall within the spirit and scope of the appended claims.

With regard to the various functions performed by the above-described components, modules, devices, circuits, systems, etc., the terms (including a reference to a "means") used to describe such components or modules are intended to also include, unless otherwise indicated, any structure(s) which performs the specified function of the described component or module (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various example embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

updating a metadata repository, wherein the metadata repository comprises first metadata representative of structured data of a data system and second metadata representative of unstructured data of the data system;

based on the metadata repository, updating a large language model, wherein updating the large language model comprises retraining the large language model;

in response to receiving a query, determining, using the first metadata representative of structured data and the second metadata representative of unstructured data of the data system, data, from the data system, applicable to the query;

generating a response to the query, wherein the response is generated using the large language model based on the data determined to be applicable to the query, determining a first authorization token associated with the query; and in response to a determination that the first authorization token does not comprise an authorization to access the data determined to be applicable to the query, requesting a second authorization token to access the data determined to be applicable to the query, wherein the second authorization token comprises the authorization to access the data determined to be applicable to the query, and wherein the response is generated in response to receiving the second authorization token.

2. The system of claim 1, wherein the operations further comprise:

repeatedly transforming the unstructured data of the data system into a defined data format, resulting in transformed data, wherein the second metadata representative of unstructured data of the data system is updated based on the transformed data.

3. The system of claim 1, wherein the response is generated in response to a determination that the first authorization token comprises the authorization to access the data determined to be applicable to the query.

4. The system of claim 1, wherein the operations further comprise:

in response to a determination that the first authorization token does not comprise the authorization to access the data determined to be applicable to the query, determining alternate data, from the data system, applicable to the query, wherein the first authorization token is determined to comprise authorization to access the alternate data.

5. The system of claim 1, wherein the generating of the response to the query comprises querying, using structured query language, the structured data of the data system, and wherein the response to the query is further generated based on a response to the querying using the structured query language.

6. The system of claim 1, wherein the generating of the response to the query comprises:

preparing, using retrieval augmented generation, the unstructured data, resulting in prepared data, and based on the prepared data, searching for relevant vectors relevant to the prepared data from an associated vector database, wherein the vector database comprises embedding vectors that have been translated from natural language in the unstructured data.

7. The system of claim 1, wherein the operations further comprise:

in response to a determination that the query comprises a request for a prediction, performing time series forecasting based on the structured data of the data system and the unstructured data of the data system, wherein the response to the query is further generated based on the time series forecasting.

8. The system of claim 1, wherein the response to the query is further generated based on one or more prior queries, from before the query was received, and wherein the one or more prior queries and the query originated from a common user entity.

9. A non-transitory machine-readable medium, comprising executable instructions that, when executed by at least one processor, facilitate performance of operations, comprising:

repeatedly updating a metadata database, wherein the metadata database comprises first metadata representative of structured data of a data storage system and second metadata representative of unstructured data of the data storage system;

based on the metadata database, updating a large language model, wherein updating the large language model comprises training the large language model;

in response to receiving an information request, determining, using the first metadata representative of structured data and the second metadata representative of unstructured data of the data storage system, data, from the data storage system, applicable to the information request;

generating an answer to the information request, wherein the answer is generated using the large language model based on the data determined to be applicable to the information request;

determining a first authorization token associated with the information request; and in response to a determination that the first authorization token does not comprise an authorization to access the data determined to be applicable to the information request, requesting a second authorization token to access the data determined to be applicable to the information request, wherein the second authorization token comprises the authorization to access the data determined to be applicable to the information request, and wherein the answer is generated in response to receiving the second authorization token.

10. The non-transitory machine-readable medium of claim 9, wherein the data storage system comprises an item database, and wherein the structured data and the unstructured data comprise attributes applicable to one or more items represented in the item database.

11. The non-transitory machine-readable medium of claim 9, wherein the operations further comprise:

determining at least one data redundancy in the structured data and the unstructured data, wherein the repeatedly updating of the metadata database is performed based on the at least one data redundancy.

12. The non-transitory machine-readable medium of claim 9, wherein the unstructured data comprises text-based documents and images.

13. The non-transitory machine-readable medium of claim 9, wherein the structured data is structured according to a defined format natively compatible with the large language model.

14. The non-transitory machine-readable medium of claim 9, wherein the information request comprises an audio-based information request, an image-based information request, a video-based information request, or a text-based information request.

15. A method, comprising:

updating by a system comprising at least one processor, metadata, wherein the metadata is representative of structured data of a data system and is representative of unstructured data of the data system;

based on the metadata, updating, by the system, a large language model, wherein updating the large language model comprises retraining the large language model;

in response to receiving a query, determining, by the system, using the metadata, data, from the data system, applicable to the query;

generating, by the system, a response to the query, wherein the response is generated using the large language model based on data determined to be applicable to the query;

determining, by the system, a first authorization token associated with the query; and in response to a determination that the first authorization token does not comprise an authorization to access the data determined to be applicable to the query, requesting, by the system, a second authorization token to access the data determined to be applicable to the query, wherein the second authorization token comprises the authorization to access the data determined to be applicable to the query, and wherein the response is generated in response to receiving the second authorization token.

16. The method of claim 15, further comprising:

transforming, by the system, the unstructured data of the data system into a unified data format, resulting in transformed data, wherein the metadata representative of unstructured data of the data system is updated based on the transformed data.

17. The method of claim 15, further comprising:

determining, by the system, an access token associated with the query, wherein the response is generated in response to a determination that the access token comprises an authorization to access the data determined to be applicable to the query.

18. The method of claim 15, wherein the generating of the response to the query comprises preparing, using retrieval augmented generation, the unstructured data, resulting in prepared data, and searching for applicable vectors, applicable to the prepared data, from an associated vector database, wherein the vector database comprises embedding vectors that have been translated from natural language of the unstructured data.

19. The method of claim 15, wherein the data system comprises a product database, and wherein the structured data and the unstructured data comprise attributes applicable to one or more products represented in the product database.

20. The method of claim 15, wherein the response to the query is further generated based on one or more prior queries, from before the query was received, and wherein the one or more prior queries and the query originated from a common user entity.

* * * * *